(12) United States Patent
Zhao

(10) Patent No.: US 8,213,364 B2
(45) Date of Patent: Jul. 3, 2012

(54) METHOD FOR RELEASING A HIGH RATE PACKET DATA SESSION

(75) Inventor: Xiaowu Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 159 days.

(21) Appl. No.: 12/663,116

(22) PCT Filed: Dec. 11, 2007

(86) PCT No.: PCT/CN2007/003545
§ 371 (c)(1),
(2), (4) Date: May 24, 2010

(87) PCT Pub. No.: WO2008/148267
PCT Pub. Date: Dec. 11, 2008

(65) Prior Publication Data
US 2010/0257589 A1    Oct. 7, 2010

(30) Foreign Application Priority Data
Jun. 5, 2007    (CN) .......................... 2007 1 0111760

(51) Int. Cl.
H04L 12/56    (2006.01)
(52) U.S. Cl. ........................................................ 370/328
(58) Field of Classification Search .................... 370/328
See application file for complete search history.

(56) References Cited

U.S. PATENT DOCUMENTS

2006/0026670 A1    2/2006  Potter et al.
2006/0072506 A1*   4/2006  Sayeedi et al. ................ 370/331
2007/0153750 A1*   7/2007  Baglin et al. .................. 370/338
2008/0092224 A1*   4/2008  Coulas et al. .................. 726/12
2010/0214975 A1*   8/2010  Kwak et al. ................... 370/328

FOREIGN PATENT DOCUMENTS

CN           1448861        10/2003
KR        20050119407       12/2005

OTHER PUBLICATIONS

3GPP2 A.S0008-0 v3.0, 'Interoperability Specification (IOS) for High Rate Packet Data (HRPD) Access Network Interfaces', Revision 0, May 2003, pp. 1-128.*
International Search Report from corresponding International Application No. PCT/CN2007/003545, mailed Mar. 20, 2008.

* cited by examiner

*Primary Examiner* — Melvin Marcelo
(74) *Attorney, Agent, or Firm* — Kenyon & Kenyon LLP

(57) ABSTRACT

The invention discloses a method for releasing a high rate packet data (HRPD) session, including the following steps: S302, in the case that the access network (AN) determines to reauthenticate the access terminal (AT), it authenticates the AT via the established connection with the AT; S304, in the case that the reauthentication of the AT is not passed, the AN or the AT initiates the release of the HRPD session; S306, the AN closes the HRPD session with the AT, and sends to the packet control function (PCF) entity a first releasing message indicating of releasing the resource and the connection and starts a first timer; S308, the PCF eneity sends to the packet data service node (PDSN) a second releasing message indicating of releasing the connection and starts a second timer; S310, the PDSN releases the connection and feeds back a second release response message to the PCF entity, and the PCF entity stops the second timer upon receiving the second release response message; S312, the PCF entity sends a first release response message to the AN, and the AN stops the first timer upon receiving the first release response message.

5 Claims, 5 Drawing Sheets

METHOD FOR RELEASING A HIGH RATE PACKET DATA SESSION

FIELD OF THE INVENTION

The invention relates to the communication field, in particular to a method for releasing a CDMA high rate packet data (HRPD) session.

BACKGROUND OF THE INVENTION

High rate packet data (HRPD for short) network technology ensures that a wireless network based on CDMA access system better adapts to various new services in the future, such as VoIP, multimedia service and etc. In the access network technologies, there are various relevant flows for supporting the technology of Version A of HRPD air interface.

FIG. 1 shows an existing call flow for releasing HRPD session, which is initiated by an access terminal (AT for short) or an access network (AN for short), and the process of which will result in the release of the packet data session if it exists. Assuming the A8 connection has been established, the flow shown in FIG. 1 applies to either the session control and mobility management is located in AN or the packet control function entity (PCF for short). As shown in FIG. 1, the flow includes the following steps:

S102: The AT or AN initiates a HRPD session release.

S104: After closing the HRPD session with AT, AN sends to PCF an A9-release-A8 message with the cause value of "normal call releasing", requesting that PCF releases all associated dedicated resources and all associated A10 connections. The AN starts a timer Tre19.

S106: the PCF sends to PDSN an A11 registration request message with the lifetime of 0 so as to close the A10 connections. Active Stop accounting records are included in the message for all IP flows in the activated state associated with the AT. The PCF starts a timer Tregreq.

S108: the PDSN stores the accounting data for a further processing and completes the release of the A10 connections with A11-registration response message as the response. The PCF stops the timer Tregreq.

S110: PCF sends to An A9-release-A8 complete message to AN, AN stops the timer Tre19.

FIG. 2 shows a call flow for releasing HRPD session, which is initiated by the AT or AN and the process of will result in the release of the packet data session if it exists. Assuming the A8 connection is not established, the flow shown in FIG. 2 applies to the session control and mobility management is located in AN. As shown in the FIG. 2, the flow includes the following steps:

S202: the AT or AN initiates the release of the HRPD session.

S204, when closing the HRPD session with the AT, the AN sends to the PCF an A9-update-A8 message with the cause value of "Power down from dormant state", requesting the PCF to release the related specific resources and the A10 connection. The AN starts a timer $T_{upd9}$.

S206: the PCF sends to the PDSN an A11-registration request message with the lifetime of 0 so as to close the A10 connections. The PCF starts the timer $T_{regreq}$.

S208: the PDSN completes the release of the A10 connections with the A11-registration response message as the response. The PCF stops the timer $T_{regreq}$ upon receiving such message.

S210: the PCF sends the A9-update-A8 Ack message to the AN. The AN stops the timer $T_{upd9}$ upon receiving such message.

The respective reasons for releasing the HRPD session in the above flows are embodied in the messages of A9-release-A8 and the A9-update-A8. That is, in the case that the A8 connection exists, the cause value is 'normal call release'; and in the case that the A8 connection does not exist, the cause value is 'Power down from dormant state'.

In fact, the causes for closing a session is more than the above two reasons. When the HRPD session exists, the network can reauthenticate the AT any time, so as to ensure that valid users can enjoy services and to prevent unauthorized users from using services. Once the reauthentication of the user fails, the AT and AN must release the HRPD session connection immediately. Therefore, the failure of reauthentication of a terminal user is also an important situation which causes the release of the corresponding session.

INVENTION SUMMARY

In view of one or more problems above, the present invention discloses a method for releasing a high rate packet data session based on the failure of the reauthentication of AT.

The method for releasing a high rate packet data (HRPD) session according to the present invention includes the following steps: S302, in the case that the AN determines to reauthenticate the AT, it authenticates the AT via an established air interface connection with the AT; S304, in the case that the reauthentication of the AT is not passed, the AN or the AT initiates the release of the HRPD session; S306, the AN closes the HRPD session with the AT, and sends to the PCF entity a first releasing message indicating of releasing the resource and the connection and starts a first timer; S308, the PCF entity sends to the PDSN a second releasing message indicating of releasing the resource (namely A10 connection(s)) and starts a second timer; S310, the PDSN releases all the A10 connections and feeds back a second release response message to the PCF entity, and the PCF entity stops the second timer after receiving the second release response message; and S312, the PCF entity, after releasing A8 connection(s), sends a first release response message to the AN which stops the first timer upon receiving the response message.

With no air interface connection existing between AT and AN (that is, the AT is in dormant state), the AN and AT firstly establish an air interface connection, and then carry out reauthentication.

Meanwhile, S302 includes: Step a1, the AN determines to reauthenticate the AT wherein it firstly establishes an air interface connection with the AT when no air interface connection exists therebetween, then the AN and AT prepare in access flow for data exchange; Step b1, the AT and AN initiate a negotiations of point-to-point protocol (PPP) and link control protocol (LCP), and the AN uses a CHAP Challenge message to initiate a random challenge to the AT; Step c1, the AN sends an access request (A12-Access Request) message to the RADIUS server via the interface A12; Step d1, the RADIUS server carries out authentication on the basis of the attribute of user name in the access request message, sends a Access Reject (A12-Access Reject) message to the AN via the interface A12 when the authentication is failed, and the AN sends CHAP Challenge Fail with a failure indication to the AT upon receiving the access reject message.

In Step S306, if the A8 connection exists between the AN and PCF, the AN sends to the PCF entity the A9-release-A8 message with a cause value of authentication failure, so as to request the PCF entity to release the relevant specific resources and the A10 connection(s). If no A8 connection exists between the AN and the PCF entity, the AN sends to the PCF entity the A9-update-A8 message with the cause value of authentication failure, so as to request the PCF entity to release the relevant specific resources and the A10 connection(s).

In Step S308, the PCF entity sends to the PDSN an A11 registration request message with the lifetime of 0 so as to close all the A10 connections, wherein in the case of the A8 connection existing, the A11 registration request message includes the Active Stop accounting records all IP flows in the activated state associated with the AT.

In Step S310, when the A8 connection exists, the PDSN stores the accounting data and releases the A10 connection and simultaneously feeds back to the PCF entity the A11 registration response message as a second release response message. In Step S312, the PCF entity feeds back the A9-update-A8 Ack message to the AN.

Another method for releasing a high rate packet data (HRPD) session according to the present invention includes the following steps: S602, in the case that the PCF entity determines to reauthenticate the AT, it establishes a connection for authentication with the AN and authenticate the AT; S604, in the case that the reauthentication of the AT is not passed, the AN or AT initiates the release of the HRPD session; S606, the AN closes the HRPD session with the AT, sends to the PCF entity a first releasing message indicating of releasing the resource and the connection and starts a first timer; S608, the PCF entity sends to the PDSN a second releasing message indicating of releasing the connection (namely the A10 connection) and starts a second timer; S610, the PDSN releases all the A10 connections and feeds back a second release response message to the PCF entity, then the PCF entity stops the second timer upon receiving the second release response message; S612, the PCF entity releases the resources (namely A8 connection) and sends a first release response message to the AN which stops the first timer upon receiving the response message.

Meanwhile, Step S602 includes: Step a2, the PCF entity determines to reauthenticate the AT, sends an authentication command to the AN requesting to authenticate the AT and simultaneously starts the third timer; Step b2, the AN sends an authentication request message to the PCF entity so as to establish the connection used for the authentication and starts the fourth timer, and the PCF entity stops the third timer; Step c2, the PCF entity feeds back an authentication response message to the AN upon receiving the authentication request message, and the AN stops the fourth timer upon receiving the authentication response message; Step d2, the AN and AT get ready for data exchange in access flow and the AT and PCF entity initiate a connection of point-to-point protocol connection therebetween and make a negotiation of link control protocol; Step e2, the PCF entity uses a CHAP challenge message to initiate a random challenge to the AT and sends the access request message to the RADIUS server via A12 interface upon receiving the feedback of the AT; Step f2, the RADIUS server carries out the authentication on the basis of the attribute of user name of the access request message terminal, sends an Access Reject message to the PCF entity via the A12 interface in the case of the authentication not passed; and the PCF entity sends a failure indication of the CHAP access authentication to the AT; Step g2, the PCF entity sends to the AN an authentication completion message with the cause value of authentication failure and starts the fifth timer, the AN feeds back an authentication completion conformation message to the PCF entity, and the PCF entity stops the fifth timer upon receiving the confirmation message.

In Step S606, the AN sends to the PCF entity the A9-release-A8 message with the cause value of authentication failure, requesting the PCF entity to release the relevant specific resources and the A10 connection.

In Step S608, the PCF entity sends to the PDSN the A11 registration request message with the lifetime of 0 so as to close all the A10 connections wherein the A11 registration request message includes Active Stop accounting records all IP flows in the activated state associated with the AT.

In Step S610, the PDSN stores the accounting data and releases the connection, and at the same time feeds back to the PCF entity the A11 registration response message as a second release response message.

In Step S612, the PCF entity feeds back to the AN the A9-update-A8 confirmation message as a first releasing response message.

The invention perfects the release of HPRD session in the access network technology, and provides a new way for releasing the HRPD session, that is, when the reauthentication of the AT fails, the HRPD session is released immediately to terminate the relevant services, thus reinforcing the security of network services of operators.

BRIEF DESCRIPTION OF THE DRAWINGS
DESCRIPTION OF THE DRAWINGS

As a part of the invention, the drawings to be described herein are used for providing further understanding of the invention. The exemplary embodiments of the present invention and the descriptions thereof are used for explaining the present invention, but not for limiting the same, in which.

DETAILED DESCRIPTION OF THE INVENTION

Figure 1:
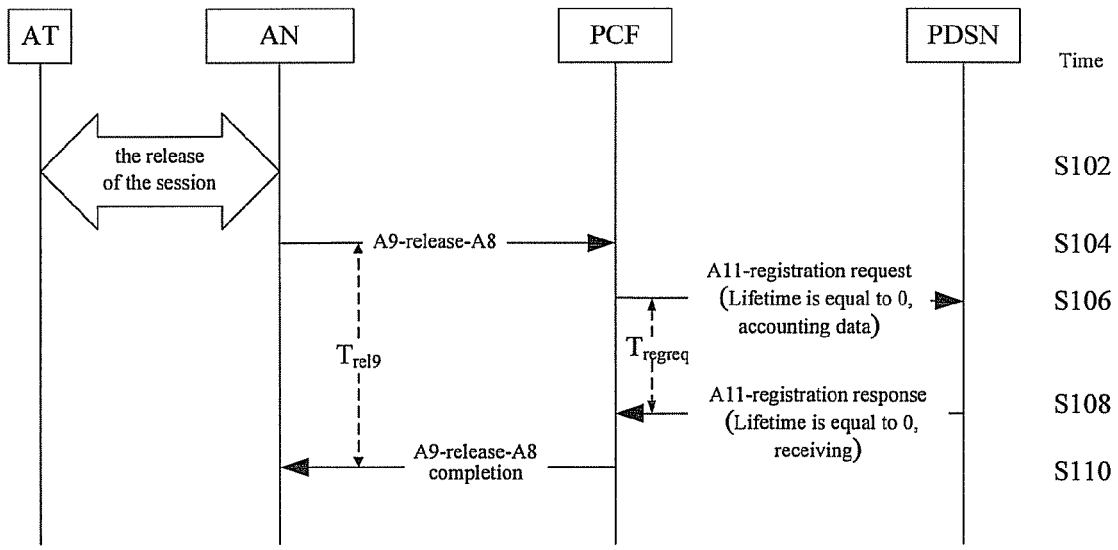
FIG. 1 is a schematic flow chart showing the process that the AN or the AT in the existing technology initiates the release of the HRPD session (when A8 connection exists)
Figure 2:
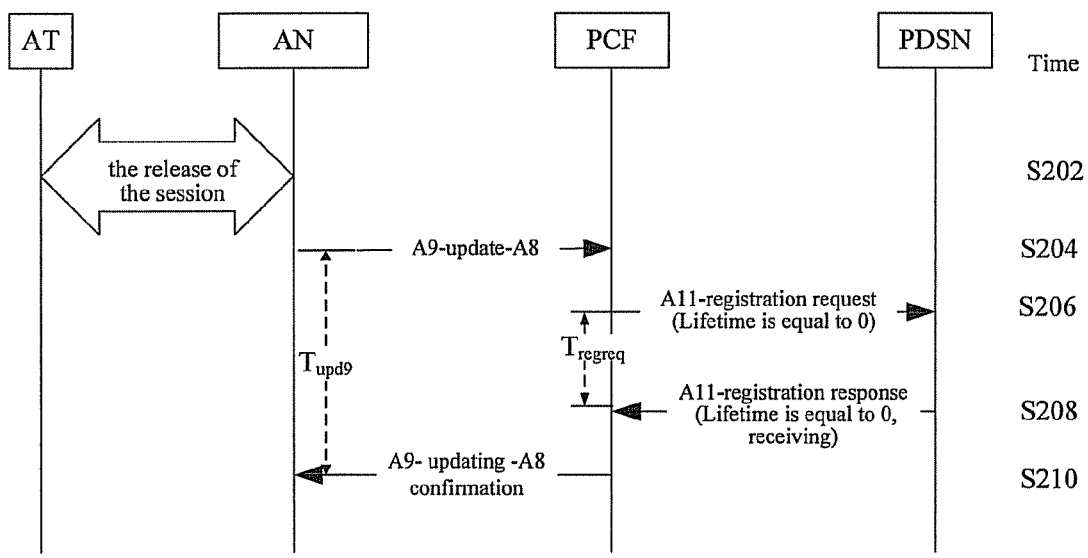
FIG. 2 is a schematic flow chart showing the process that the AN or the AT in the existing technology initiates the release of the HRPD session (when A8 connection does not exist, and the session control and mobility management are in the AN)

The embodiments of the present invention will be described hereinafter in detail referring to the drawings.

Figure 3:
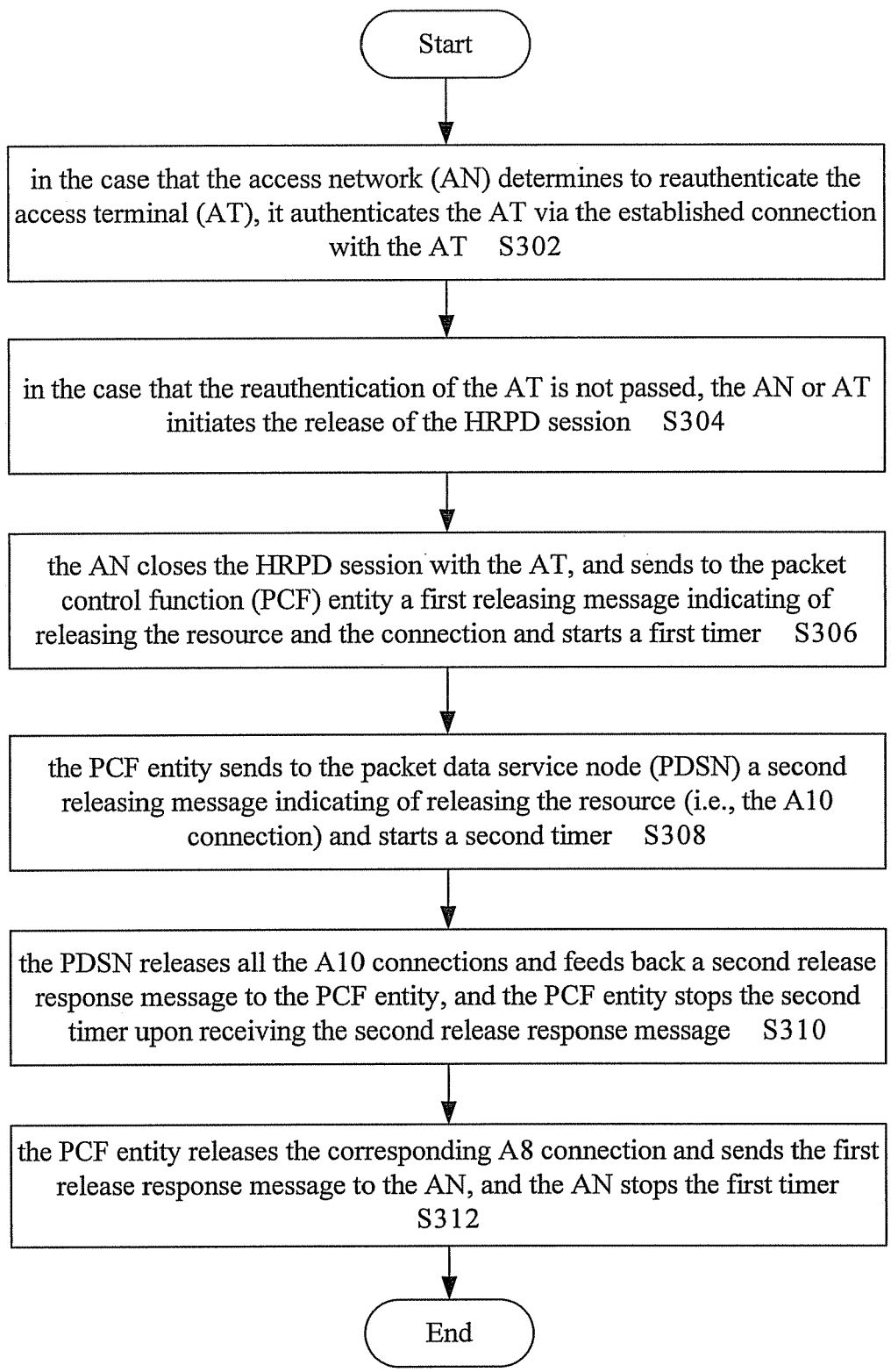
FIG. 3 is a flow chart showing the method for releasing the HRPD session according to the embodiment of the present invention.

The method for releasing the HRPD session according to the embodiment of the present invention will be described referring to FIG. 3. As shown in FIG. 3, the method for releasing the HRPD session includes the following steps:

S302, when determining to reauthenticate AT, the AN authenticates the AT by an established connection with the AT; S304, in the case that the reauthentication of the AT is not passed, the AN or AT initiates the release of the HRPD session; S306, the AN closes the HRPD session with the AT and sends to the PCF entity a first releasing message indicating of releasing the resources and the connection, and starts a first timer; S308, the PCF entity releases the resources and connection, sends to the PDSN a second releasing message indicating of releasing the connection, and starts a second timer; S310, the PDSN releases the connection and feeds back a second release response message to the PCF entity, and the PCF entity stops the second timer upon receiving the second release response message; and S312, the PCF entity sends a first release response message to the AN, and the AN stops the first timer upon receiving the response message. Meanwhile, when no air interface connection exists between the AN and the AT, the AN and AT firstly establish an air interface connection, and then make the reauthentification.

Figure 4:
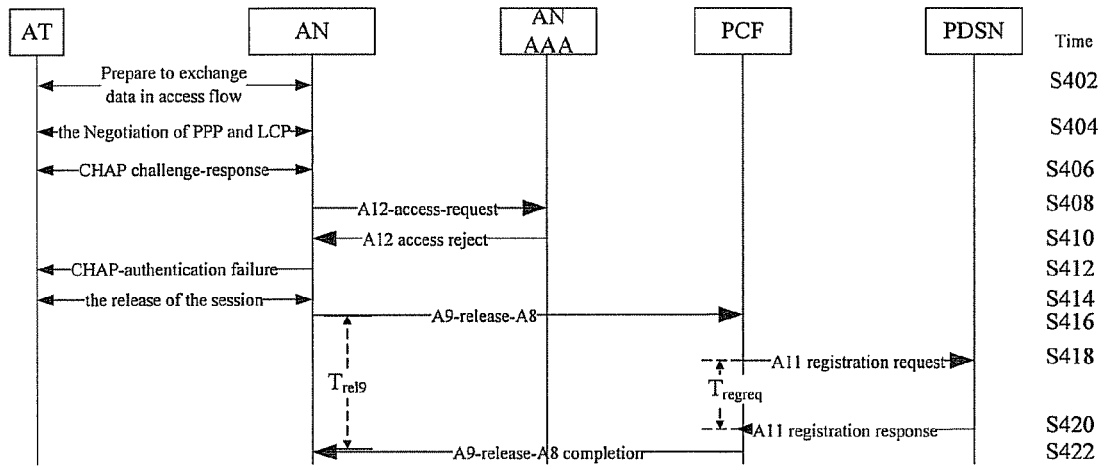
FIG. 4 is a schematic flow chart showing the process that the reauthentication failure of the AT results in the release of the HRPD session (the session control and the mobility management are in the AN, and the A8 connection exists) according to the embodiment of the present invention.

Particularly, referring to FIG. 4, it is described the flow of process that the reauthentication failure of the AT results in the release of the HRPD session according to the embodiment of the invention when the session control and the mobility management are in the AN and the A8 connection exists. If a packet data session exists when the reauthentication of the AT fails, the process shown in FIG. 4 will result in the release of the packet data session. In the embodiment shown in FIG. 4, it is assumed that the A8 connection has been established. The flow shown in FIG. 4 is adapted when the session control and mobility management are placed on AN. As shown in FIG. 4, the flow includes the following steps:

S402, The AN determines that re-Authentication of an AT is required and indicates to the AT that it wants to open the access stream by sending the Data Ready indicator on the Access stream.

S404, It is initiated between the AT and the AN a negotiation of point-to-point protocol (PPP for short) and link control protocol (LCP for short) that are used for access authentication. When the AN and the AT keep the PPP connection established after the initial access authentication, this step can be omitted.

S406, the AN uses a CHAP (challenge handshake authentication protocol) challenge message to initiate a random challenge to the AT.

S408, after receiving the CHAP response message sent by the AT, the AN sends via the interface A12 an access request message to AN-AAA (that is authentication, authorization and accounting, short for AAA) as the RADIUS server.

S410, The AN-AAA looks up a password based on the User-name attribute in the Access-Request message and if the access authentication failure, the AN-AAA sends an Access-Reject message on the A12 interface S412, The AN returns an indication of CHAP access authentication fail to the AT.

S414, the AT or AN initiates the release of the HRPD session.

S416, after closing the HRPD session with the AT, the AN sends to the PCF an A9-update-A8 message (the first releasing message) with the cause value of authentication failure, requesting the PCF to release the relevant specific resources and the A10 connections. The AN starts the (first) timer $T_{upd9}$.

S418, the PCF sends to the PDSN an A11 registration request message (the second releasing message) with the lifetime of 0 so as to close the A10 connection. This message includes Active Stop accounting records all IP flows in the activated state associated with the AT. The PCF starts the (second) timer $T_{regreq}$.

S420, the PDSN stores the accounting data for further processing, and simultaneously completes the release of the A10 connection with the A11 registration response message (the second release response message) as the response. The PCF stops the timer $T_{regreq}$.

S422, the PCF sends an A9-update-A8 confirmation message (the second release response message) to AN. The AN stops the timer $T_{upd9}$.

Figure 5:
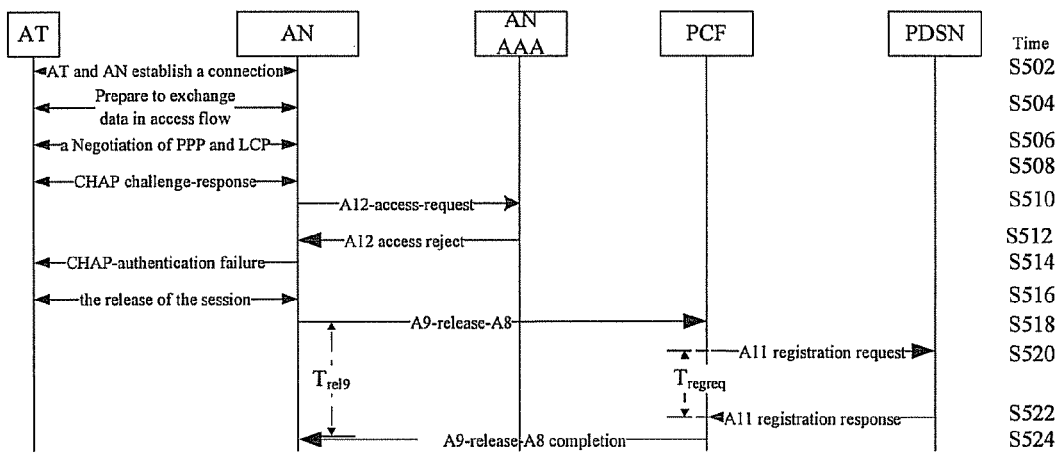
FIG. 5 is a schematic flow chart showing the process that the reauthentication failure of the AT results in the release of the HRPD session (the session control and the mobility management are in the AN, and the A8 connection does not exist) according to the embodiment of the present invention.

Referring to FIG. 5, it is described the flow of the process that the reauthentication failure of AT results in the release of the HRPD session according to the embodiment of the present invention wherein the session control and the mobility management are on the AN and the A8 connection does not exist. If a packet data session exists when the reauthentication of the AT fails, the process shown in the FIG. 5 will result in the release of the packet data session. In the embodiment shown in FIG. 5, it is assumed that the A8 connection does not exist. The flow shown in FIG. 5 is adapted when the session control and the mobility management are on the AN. As shown in the FIG. 5, the flow includes the following steps:

S502, The AN, determining to reauthenticate a certain AT, establishes an air interface connection with the AT at first.

S504, The AN sends an indication of data ready to the AT in the access flow, showing it is about to open an access flow.

S506, A negotiations of PPP and LCP for the access authentication is initiated between the AT and AN. When the AN and the AT keep the PPP connection established after the initial access authentication, this step can be omitted.

S508, The AN uses a CHAP challenge message to initiate a random challenge to the AT.

S510, After receiving the CHAP response message sent by the AT, the AN sends via the interface A12 an access request message to AN-AAA as the RADIUS server.

S512, The AN-AAA inquires one password based on the attribute of user name in the access request message. If the access authentication is not passed, the AN-AAA sends a Access Reject message via the interface A12.

S514, The AN sends a failure indication of the CHAP access authentication to the AT.

S516, The AT or AN initiates the release of the HRPD session.

S518, After closing the HRPD session with the AT, the AN sends to the PCF an A9-update-A8 message with the cause value of Authentication Failure, requesting the PCF to release the relevant specific resources and the A10 connection. The AN starts the timer $T_{upd9}$.

S520, the PCF sends to the PDSN a A11 registration request message with the lifetime of 0 so as to close the A10 connections. The PCF starts the timer $T_{regreq}$.

S522, the PDSN completes the release of the A10 connection with the A11 registration response message as the response. The PCF stops the timer $T_{regreq}$.

S524, the PCF sends to the AN an A9-update-A8 confirmation message. The AN stops the timer $T_{upd9}$.

Figure 6:
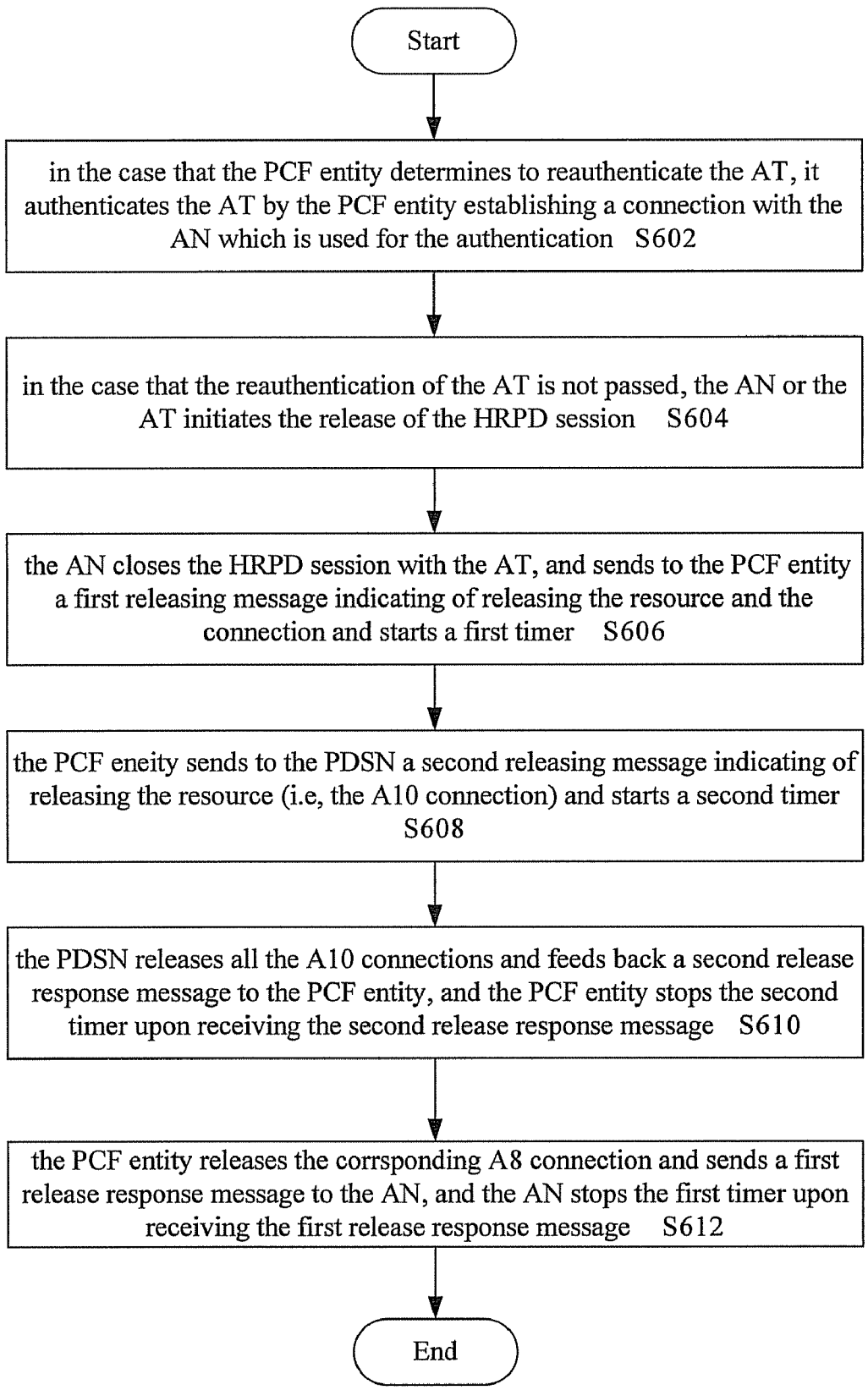
FIG. 6 is a flow chart showing the method for releasing the HRPD session according to another embodiment of the present invention.

Referring to FIG. 6, it is described the method for releasing the HRPD session according to another embodiment of the present invention. As shown in FIG. 6, the method for releasing a HRPD session includes the following steps: S602, in the case that the PCF entity determines to reauthenticate the AT, it authenticates the AT by the PCF entity establishing a connection with the AN which is used for the authentication; S604, in the case that the reauthentication of the AT is not passed, the AN or AT initiates the release of the HRPD session; S606, the AN closes the HRPD session with the AT, and sends to the PCF entity a first releasing message indicating of releasing the resources and the connection and starts a first timer; S608, the PCF entity sends to the PDSN a second releasing message indicating of releasing the connection and starts a second timer; S610, the PDSN releases the connection and feeds back a second release response message to the PCF entity, and the PCF entity stops the second timer upon receiving the second release response message; and S612, the PCF entity sends a first release response message to the AN, and the AN stops the first timer upon receiving the response message.

Figure 7:
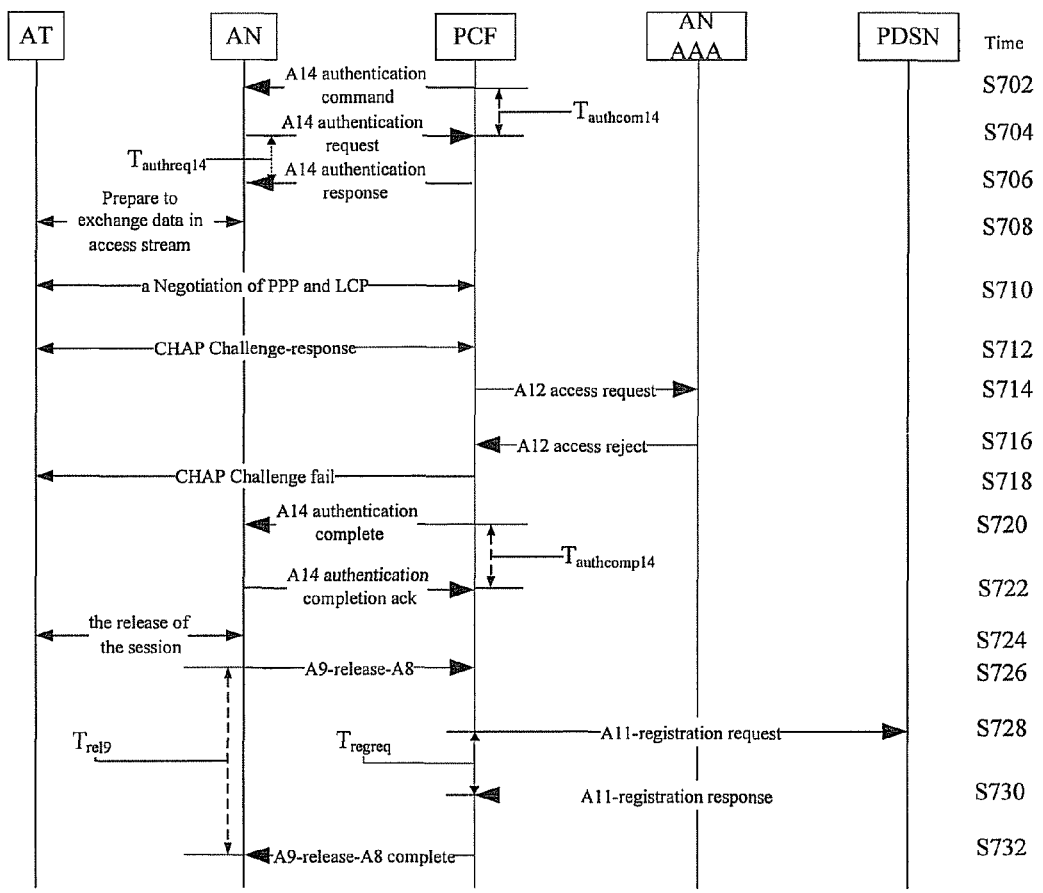
FIG. 7 is a schematic flow chart showing the process that the reauthentication failure of the AT results in the release of the HRPD session (the session control and the mobility management are in the PCF, and the A8 connection exists) according to another embodiment of the present invention.

Particularly, referring to FIG. 7, it is described the flow of the process that a reauthentication failure of AT results in the release of the HRPD session according to the embodiment of the present invention wherein the session control and the mobility management are in the PCF and the A8 connection exists. If a packet data session exists when the reauthentication of the AT fails, the process shown in FIG. 7 will result in the release of the packet data session. In the embodiment shown in FIG. 7, it is assumed that the A8 connection has been established. The flow shown in FIG. 7 is adapted when the session control and the mobility management are in the PCF. As shown in FIG. 7, the flow includes the following steps:

S702, the PCF determines to re-authenticate a certain AT, and sends an A14-authentication command message to the AN, requesting the latter to prepare the authentication for the AT. The PCF starts the timer $T_{authcom14}$ (the third timer)

S704, the AN sends an A14-authentication request message, requesting to establish the A20 connection used for authentication. The AN starts the timer $T_{authreq14}$ (the fourth timer). The PCF stops the timer $T_{authcom14}$ upon receiving the A14-authentication request message.

S706, the PCF sends an A14-authentication response message to the AN and establishes the connection A20. The AN stops the timer $T_{authreq14}$ upon receiving the message.

S708, the AN shows to the AT that AN needs to open access flow to transfer data thereon.

S710, a negotiation of the PPP and LCP used for access authentication is initiated between the AT and PCF. The negotiation data can be transmitted via the connection A20 established with the steps S704 and S706. When the AN and the AT keep the PPP connection established after the initial access authentication, this step can be omitted.

S712, PCF uses a CHAP challenge message to initiate a random challenge to the AT.

S714, after receiving the CHAP response message sent by the AT, the PCF sends an access request message to AN-AAA as the RADIUS server via the interface A12.

S716, the AN-AAA inquires one password based on the attribute of user name in the access request message. If the access authentication is not passed, the AN-AAA sends an access interface reject message via the interface A12.

S718, the PCF sends a failure indication of CHAP access authentication to the AT.

S720, the PCF sends an A14-authentication complete message to the AN with the cause value of 'authentication failure' carried and starts the timer $T_{authcomp14}$ (the fifth timer).

S722, the AN sends an A14-authentication completion confirmation message to the PCF. The AN stops the timer $T_{authcomp14}$ upon receiving the confirmation message.

S724, the AT or AN initiates the release of the HRPD session.

S726, after closing the HRPD session with the AT, the AN sends to the PCF an A9-release-A8 message with the cause value of authentication failure so as to request PCF to release the relevant specific resources and the A10 connection. The AN starts the timer $T_{upd9}$.

S728, the PCF entity sends to the PDSN an A11 registration request message with the lifetime of 0 so as to close the A10 connection. The message includes the activation suspension accounting records of all the activating IPs related to AT. The PCF starts the timer $T_{regreq}$.

S730, the PDSN stores the accounting data for further processing, and simultaneously completes the release of the A10 connection with the A11-registration response message as the response. The PCF stops the timer $T_{regreq}$.

S732, the PCF sends the message A9-release-A8 completed. The AN stops the timer Tupd9.

Above all, compared with the prior art, the present invention improves the HPRD session release technology in the access network technology, and provides a new way of releasing the HRPD session, thus reinforcing the security of network services of operators.

Only the preferred embodiment of the present invention is described above, without the purpose of limiting the present invention. For those skilled in the field, various alterations and modifications can be made to the present invention. Any alterations, substitutions and modifications falling into the spirit and principle of the present invention shall be protected by the claims of the present invention.

The invention claimed is:

1. A method for releasing a HRPD session, characterized in including the following steps:
  S602, in the case that a PCF entity determines to reauthenticate AT, the PCF entity authenticates the AT by establishing a connection with AN which is used for authentication;
  S604, in the case that the reauthentication of the AT is not passed, the AN or the AT initiates the release of the HRPD session;
  S606, the AN closes the HRPD session with the AT, sends to the PCF entity a first releasing message indicating of releasing the resources and the connections, and start a first timer;
  S608, the PCF entity sends to the PDSN a second releasing message indicating of releasing the connections and starts a second timer;
  S610, the PDSN releases the connections, feeds back a second release response message to the PCF entity, and the PCF entity stops the second timer upon receiving the second release response message; and
  S612, the PCF entity sends a first release response message to the AN, and the AN stops the first timer upon receiving the first release response message;
  wherein the Step S602 includes:
  Step a2, the PCF entity determines to authenticate the AT, sends an authentication command to the AN to request authenticating the AT and simultaneously starts a third timer;
  Step b2, the AN sends an authentication request message to the PCF entity so as to establish a connection used for authentication and starts a fourth timer; and the PCF entity stops the third timer;
  Step c2, the PCF entity feeds back an authentication response message to the AN upon receiving the authentication request message, and the AN stops the fourth timer upon receiving the authentication response message;
  Step d2, the AN indicates to the AT that it wants to open the access stream by sending the Data Ready indicator on the Access stream, The AT and PCF entity initiate therebetween a negotiation of point-to-point protocol and link control protocol used for access authentication;
  Step e2, the PCF entity uses a CHAP challenge message to initiate a random challenge to the AT and sends an access request message to the RADIUS server via the interface A12 upon receiving the feedback of the AT;

Step f2, the RADIUS server makes the authentication on the basis of the attribute of user name in the access request message and sends an access reject message to the PCF entity via the A12 interface in the case that the authentication is not passed, and the PCF entity sends a failure indication of CHAP access authentication to the AT; and Step g2, the PCF entity sends to the AN an authentication complete message with the cause value of authentication failure and starts a fifth timer, and the AN feeds back an authentication completion Ack message to the PCF entity which then stops the fifth timer.

2. The method for releasing a HRPD session according to claim 1, characterized in that in the Step S606, the AN sends to the PCF entity an A9-release-A8 message with the cause value of authentication failure, requesting the PCF entity to release the relevant specific resources and the A10 connections.

3. The method for releasing a HRPD session according to claim 2, characterized in that in the Step S608, the PCF entity sends to the PDSN an A11 registration request message with the lifetime of 0 so as to close the A10 connections, wherein the A11 registration request message includes Active Stop accounting records all IP flows in the activated state associated with the AT.

4. The method for releasing a HRPD session according to claim 3, characterized in that in the Step S610, the PDSN stores the accounting data and releases the connection, and simultaneously feeds back to the PCF entity the A11 registration response message as a second release response message.

5. The method for releasing a HRPD session according to claim 1, characterized in that in the Step S612, the PCF entity feeds back to the AN the A9-release-A8 complete message as a first releasing response message.

* * * * *